(12) United States Patent
Kim et al.

(10) Patent No.: US 6,414,517 B1
(45) Date of Patent: Jul. 2, 2002

(54) INPUT BUFFER CIRCUITS WITH INPUT SIGNAL BOOST CAPABILITY AND METHODS OF OPERATION THEREOF

(75) Inventors: Kyu-hyoun Kim; Jung-bae Lee, both of Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/685,266

(22) Filed: Oct. 10, 2000

(30) Foreign Application Priority Data

Oct. 30, 1999 (KR) .......................................... 99-47762

(51) Int. Cl.$^7$ ................... H03K 19/094; H03K 19/0175
(52) U.S. Cl. .......................................... 326/88; 327/390
(58) Field of Search .............................. 326/88, 92, 23, 326/24, 83; 327/390, 589

(56) References Cited

U.S. PATENT DOCUMENTS

| | | | | |
|---|---|---|---|---|
| 4,475,178 A | * | 10/1984 | Kinoshita | .................... 365/203 |
| 4,996,498 A | * | 2/1991 | Hanna | ........................ 330/258 |
| 5,856,757 A | * | 1/1999 | Eschauzier | .................. 327/553 |

* cited by examiner

*Primary Examiner*—Michael Tokar
*Assistant Examiner*—Daniel D. Chang
(74) *Attorney, Agent, or Firm*—Myers Bigel Sibley & Sajovec

(57) ABSTRACT

An input buffer includes an amplifier circuit, such as a differential amplifier circuit, inverting amplifier circuit or pull-up/pull-down amplifier circuit. A momentary boost circuit is coupled to an input buffer input terminal, an input terminal of the amplifier circuit, and an output terminal of the amplifier circuit, and is operative to generate a boosted input signal at the input terminal of the amplifier circuit from an input signal at an input buffer input terminal for an interval that is terminated responsive to an output signal at the output terminal of the amplifier circuit. The momentary boost circuit may include a detector circuit coupled to the output terminal of the amplifier circuit and operative to generate a control signal responsive to a transition of the output signal, and a boost circuit, coupled between the input buffer input terminal and the input terminal of the amplifier circuit and operatively associated with the detector circuit, that receives the input signal at the input buffer input terminal and generates the boosted input signal at the input terminal of the amplifier circuit from the received input signal responsive to the control signal. For example, the boost circuit may include a capacitor coupled between the input buffer input terminal and the input terminal of the amplifier circuit, and a switch that couples and decouples the input terminal of the amplifier circuit to a reference voltage source responsive to the control signal. The detector circuit may be operative to generate a pulse responsive to a transition of the output signal, and the switch may be operative to couple the input terminal of the amplifier circuit to the reference voltage source responsive to the pulse.

38 Claims, 7 Drawing Sheets

INPUT BUFFER CIRCUITS WITH INPUT SIGNAL BOOST CAPABILITY AND METHODS OF OPERATION THEREOF

RELATED APPLICATION

This application is related to Korean Application No. 99-47762, filed Oct. 30, 1999, the disclosure of which is hereby incorporated herein by reference.

BACKGROUND OF THE INVENTION

The present invention relates to integrated circuits and methods of operations thereof, and more particularly, to input buffer circuits and methods of operation thereof.

Integrated circuits often use input buffer circuits for receiving external signal and converting them to appropriate voltage levels. Input buffers preferably exhibit short delay time, small skew and low power consumption. Characteristic such as delay time may vary responsive to variation of power supply voltage applied to the input buffer circuit.

A typical input buffer circuit, as shown in FIG. 1, compares an input signal Vin to a predetermined reference voltage Vref. For example, the input buffer circuit 11 may include a differential amplifier that generates an output current that is proportional to the difference between the input signal Vin and the reference signal Vref, which is then used to produce a corresponding output signal Vout.

Referring to FIG. 2, when the difference Vsw between the input signal Vin and the reference voltage Vref is small, the output current may become so small that the slope of the curve describing the relationship between the input voltage difference Vsw and the output voltage Vout decreases. Consequently, the delay time and skew of the input buffer may increase. In addition, for small input voltage differentials, slowed transition of the output signal Vout may increase power consumption by circuits that receive the output signal Vout.

SUMMARY OF THE INVENTION

In embodiments of the present invention, an input buffer includes an amplifier circuit having an input terminal and an output terminal. A momentary boost circuit is coupled to an input buffer input terminal, the input terminal of the amplifier circuit, and the output terminal of the amplifier circuit, and is operative to generate a boosted input signal at the input terminal of the amplifier circuit from an input signal at an input buffer input terminal for an interval that is terminated responsive to an output signal at the output terminal of the amplifier circuit. The momentary boost circuit may include a detector circuit coupled to the output terminal of the amplifier circuit and operative to generate a control signal responsive to a transition of the output signal, and a boost circuit, coupled between the input buffer input terminal and the input terminal of the amplifier circuit and operatively associated with the detector circuit, that receives the input signal at the input buffer input terminal and generates the boosted input signal at the input terminal of the amplifier circuit from the received input signal responsive to the control signal. The boost circuit may include, for example, a capacitor coupled between the input buffer input terminal and the input terminal of the amplifier circuit, and a switch that couples and decouples the input terminal of the amplifier circuit to a reference voltage source responsive to the control signal. The detector circuit may be operative to generate a pulse responsive to a transition of the output signal, and the switch may be operative to couple the input terminal of the amplifier circuit to the reference voltage source responsive to the pulse.

In some embodiments of the present invention, the amplifier circuit includes a differential amplifier circuit having a first input terminal, a second input terminal, and an output terminal. The differential amplifier circuit is operative to generate an output signal at the output terminal responsive to a voltage between the first and second input terminals. The boost circuit is coupled between the input buffer input terminal and the first input terminal of the differential amplifier circuit, receives the input signal at the input buffer input terminal, and generates the boosted input signal at the first input terminal of the differential amplifier circuit from the received input signal responsive to the control signal.

In still other embodiments of the present invention, the amplifier circuit includes an inverting amplifier circuit. The boost circuit may include a capacitor coupled between the input buffer input terminal and an input terminal of the inverting amplifier circuit, and a switch that couples and decouples the input terminal of the inverting amplifier circuit to a reference voltage source responsive to the control signal.

In yet other embodiments of the present invention, the amplifier circuit includes a pull-up circuit that drives the output terminal responsive to a signal at a pull-up circuit input terminal, and a pull-down circuit that drives the output terminal responsive to a signal at a pull-down circuit input terminal. The boost circuit is coupled between the input buffer input terminal and the pull-up circuit and pull-down circuit input terminals, receives the input signal at the input buffer input terminal and generates the first and second boosted input signals at respective ones of the pull-up circuit and pull-down circuit input terminals from the received input signal responsive to the control signal. The boost circuit may include respective first and second capacitors that couple the input buffer input terminal to respective ones of the pull-up circuit input terminal and the pull-down circuit input terminal, and respective first and second switches that couple and decouple respective ones of the pull-up circuit input terminal and the pull-down circuit input terminal to a reference voltage node responsive to the control signal.

In method embodiments of the present invention, an input signal is received at an input buffer input terminal. A boosted input signal is generated at an input terminal of an amplifier circuit from the received input signal for an interval that is terminated responsive to an output signal produced at an output terminal of the amplifier circuit from the boosted input signal. A control signal may be generated responsive to the output signal, and the boosted input signal may be generated responsive to the control signal. In some embodiments of the present invention, the boosted input signal is generated by coupling a capacitor between the input buffer input terminal and the input terminal of the amplifier while decoupling the input terminal of the amplifier circuit and a reference voltage node responsive to a first state of the control signal, and then coupling the input terminal of the amplifier circuit to the reference voltage node responsive to a second state of the control signal to terminate generation of the boosted input signal.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices.

Figure 1:
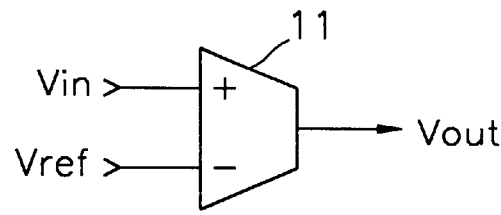
FIG. 1 is a schematic diagram of a conventional differential amplifier input buffer circuit.
Figure 2:
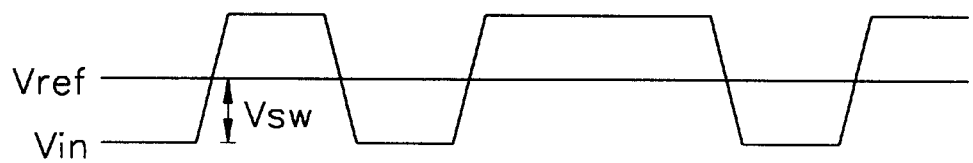
FIG. 2 is a timing diagram graphically illustration operations of the conventional differential amplifier input buffer circuit depicted in FIG. 1.
Figure 3:
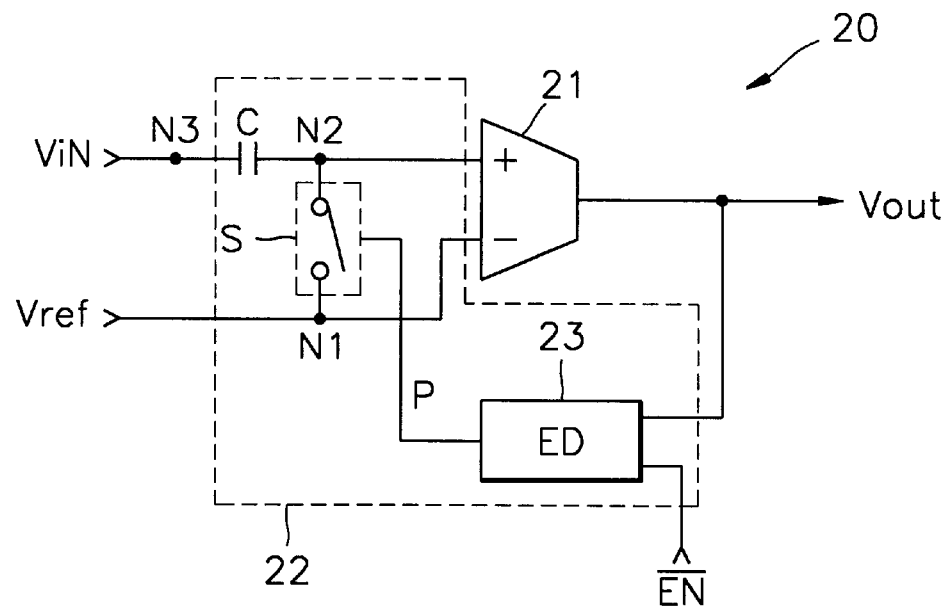
FIG. 3 is a schematic diagram of a differential amplifier input buffer circuit according to embodiments of the present invention.

Referring to FIG. 3, an input buffer circuit 20 according to a first embodiment of the present invention includes a differential amplifier 21 and a momentary boost circuit 22 including a boosting capacitor C, an edge detector circuit (ED) 23 and a switch S. The differential amplifier 21 generates an output voltage Vout responsive to a comparison of a reference voltage Vref at a first input terminal N1 and a signal input via a second input terminal N2. The boosting capacitor C is coupled between an input buffer input terminal N3 and the second input terminal N2 of the differential amplifier 21, and generates the input signal at the input terminal N2 such that it is boosted with respect to an input signal Vin which is input via the input buffer input terminal N3. The edge detector circuit 23 detects a transition of the output signal Vout of the differential amplifier 21 and generates a control signal responsively thereto when an enable signal EN is in an enabling state. The switch S couples the first and second input terminals N1, N2 of the differential amplifier 21 responsive to the control signal P.

Figure 4:
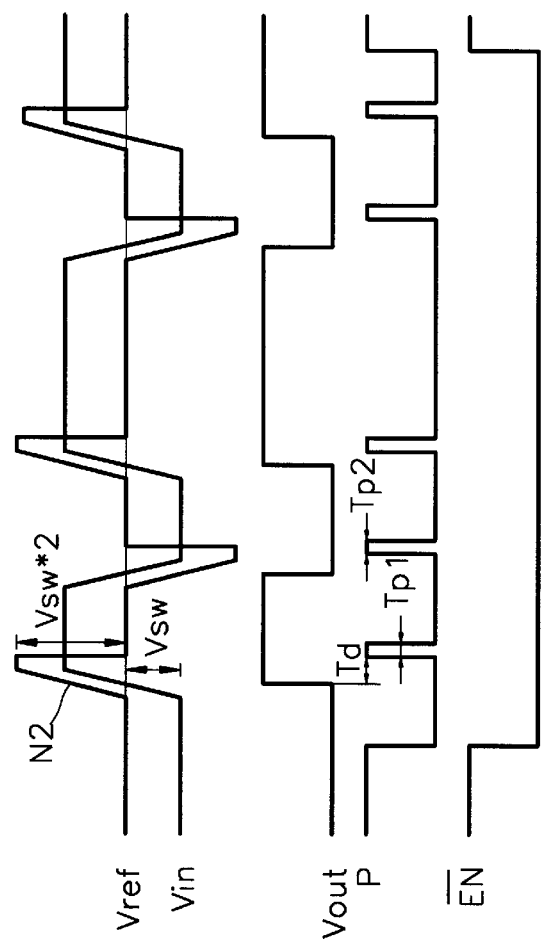
FIG. 4 is a timing diagram graphically illustrating exemplary operations of the input buffer circuit of FIG. 3.

FIG. 4 is a timing diagram graphically illustrating operations of the input buffer circuit 20 of FIG. 3. Initially, the enable signal EN is in a disabling state (logic high level), and the control signal P produced by the edge detector circuit 23 is at a logic high level. This turns on the switch S, causing the reference voltage Vref to be applied to the second input terminal N2 of the differential amplifier 21. Consequently, the second input terminal N2 has the same voltage level as that of the first input terminal N1 and the output signal Vout of the differential amplifier 21 remains at a logic low level.

After the enable signal EN is transitioned to an enabling state (logic low level), the control signal produced by the edge detector circuit 23 transitions to a logic low level, which turns off the switch S. Thereafter, when the input signal Vin transitions from a voltage Vil, which is lower than the reference voltage Vref by a voltage Vsw, to a voltage Vih, which is higher than the reference voltage Vref by the voltage Vsw, the boosting capacitor C boosts the input signal Vin so that the voltage level of the second input terminal N2 becomes Vref+2Vsw. In response, the output signal Vout transitions from a logic low level to a logic high level.

Thereafter, the edge detector circuit 23 detects the transition of the output signal Vout of the differential amplifier 21, namely, a rising edge, and, after a delay Td, generates a logic high pulse in the control signal P during an interval Tp. The pulse turns on the switch S during the interval Tp, coupling the input terminals N1, N2. When the input signal Vin subsequently transitions the voltage Vih to the voltage Vil, the boosting capacitor C boosts the input signal Vin in a negative direction such that voltage at the second input terminal N2 becomes Vref−2Vsw. Responsively, the differential amplifier 21 drives the output signal Vout to the logic low level. Subsequently, the edge detector circuit 23 detects the transition of the output signal Vout of the differential amplifier 21 and, after a delay Td, generates a pulse on the control signal P in an interval Tp, after the predetermined delay time Td. This turns on the switch circuit S and drives the voltage at the second input terminal N2 to the reference voltage Vref.

As described above, the signal input to the differential amplifier 21 via the second input terminal N2 is momentarily boosted above the level of the input signal Vin. Accordingly, the output current of the differential amplifier 21 is increased, such that the delay time and skew of the input buffer circuit may be reduced.

Figure 5:
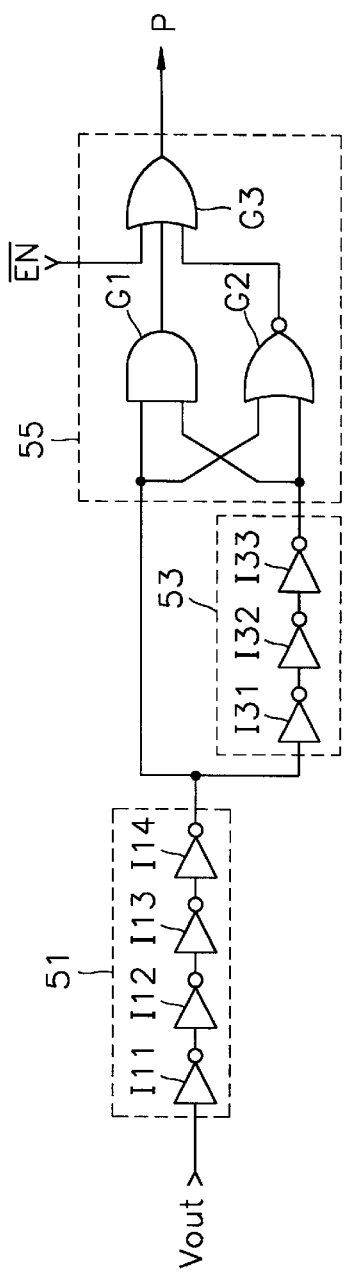
FIG. 5 is a schematic diagram of an edge detector circuit according to embodiments of the present invention.

FIG. 5 illustrates a detector circuit 23A according to embodiments of the present invention. In particular, the detector circuit 23A is a pulse generator that generates pulses in a control signal P responsive to rising and falling edges of a signal such as the output signal Vout of the differential amplifier 21 of FIG. 3. The detector circuit 23A includes a delay circuit 51, an inverting delay circuit 53 and an exclusive NOR gate 55. The delay circuit 51 generates an output signal that is a delayed replica of the signal Vout (e.g., delayed by the delay Td of FIG. 4). The inverting delay circuit 53 generates an output signal that is an inverted and delayed version of the output signal produced by the delay circuit 51 (e.g., delayed by the interval Tp of FIG. 4). The exclusive NOR gate circuit 55 receives the output signals from the delay circuit 51 and the inverting delay circuit 53 and responsively generates the control signal P when the enable signal EN is in an enabling state.

The delay circuit 51 includes four serially connected inverters I11, I12, I13, I14, while the inverting delay circuit 53 includes three serially connected inverters I31, I32, I33. The exclusive NOR gate circuit 55 includes an AND gate G1, a NOR gate G2 and an OR gate G3. It will be appreciated that the detector circuit 23 of FIG. 3 may be implemented in a number of different ways known to those skilled in the art, e.g., using a number of different logic gate configurations other than those illustrated in FIG. 5.

Figure 6:
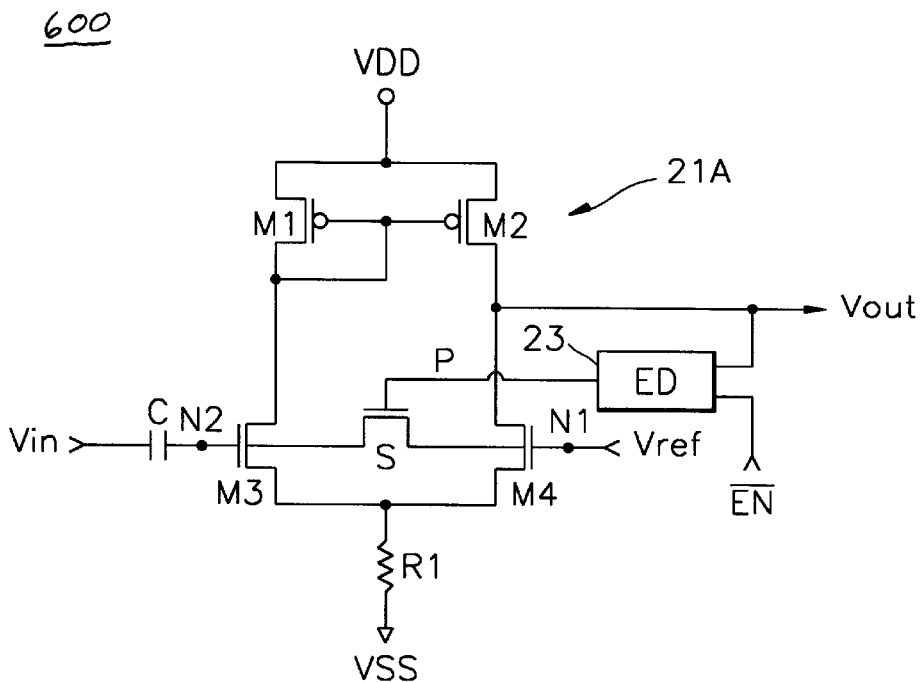
FIGS. 6–11 are schematic diagrams of differential amplifier input buffer circuits according to other embodiments of the present invention.

FIG. 6 illustrates an input buffer circuit 600 according to embodiments of the present invention. The input buffer circuit 600 includes an N type differential amplifier 21A that is coupled to power supply nodes VDD, VSS and includes PMOS load transistors M1 and M2, NMOS differential input transistors M3 and M4, and a resistor R1 which acts as a current source. The differential input transistor M4 receives a reference voltage Vref at an input terminal N1. The differential input transistor M3 receives an input signal at an input terminal N2 that is momentarily boosted with respect to an input voltage Vin via operation of an NMOS transistor S connected between the first input terminal N1 and the second input terminal N2. The NMOS transistor S operates responsive to a control signal P produced by an edge detector circuit 23 in a manner similar to that described with reference to the switch S of FIG. 3.

Figure 7:
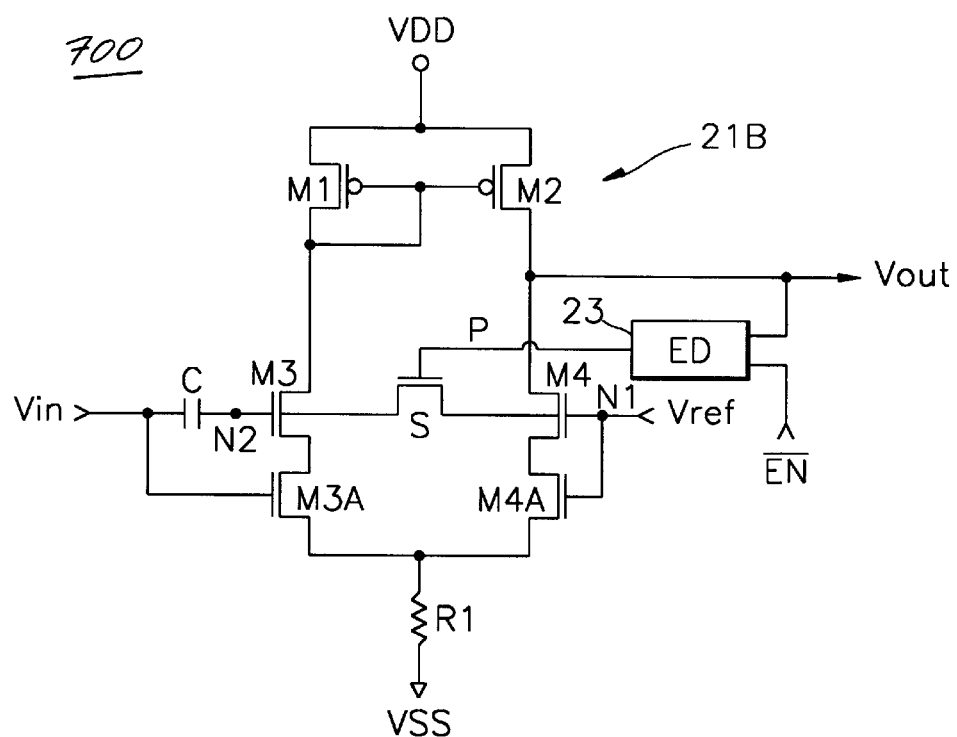

FIG. 7 illustrates an input buffer circuit 700 according to other embodiments of the present invention. Like reference numerals in FIGS. 6 and 7 refer to like elements, which will not be described in further detail here in light of the foregoing description of FIG. 6. The input buffer circuit 700 of FIG. 7 represents a modification of the input buffer circuit 600 of FIG. 6, in that a differential amplifier circuit 21B of the input buffer 700 includes NMOS transistors M3A, M4A added in series with the differential input transistors M3, M4.

Figure 8:
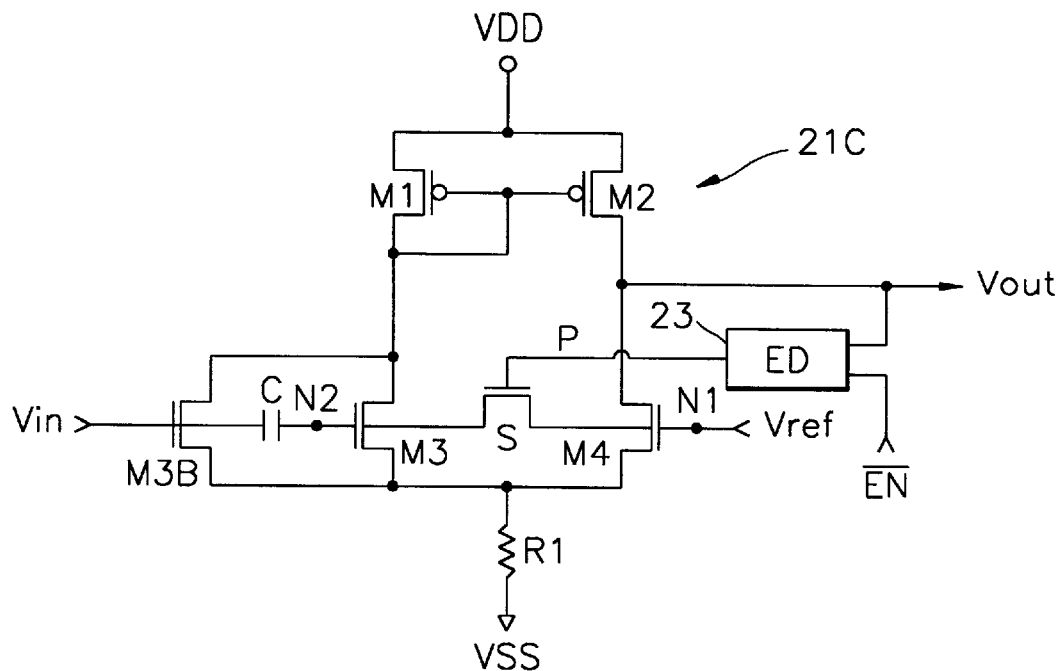

FIG. 8 illustrates an input buffer circuit 800 according to other embodiments of the invention. Like reference numerals in FIGS. 6 and 8 refer to like elements, which will not be described in further detail here in light of the foregoing description of FIG. 6. The input buffer circuit 800 represents a modification of the input buffer circuit 600 of FIG. 6 in that the differential amplifier circuit 21 C of the input buffer 800 includes an NMOS transistor M3B added in parallel to the differential input transistor M3.

Figure 9:
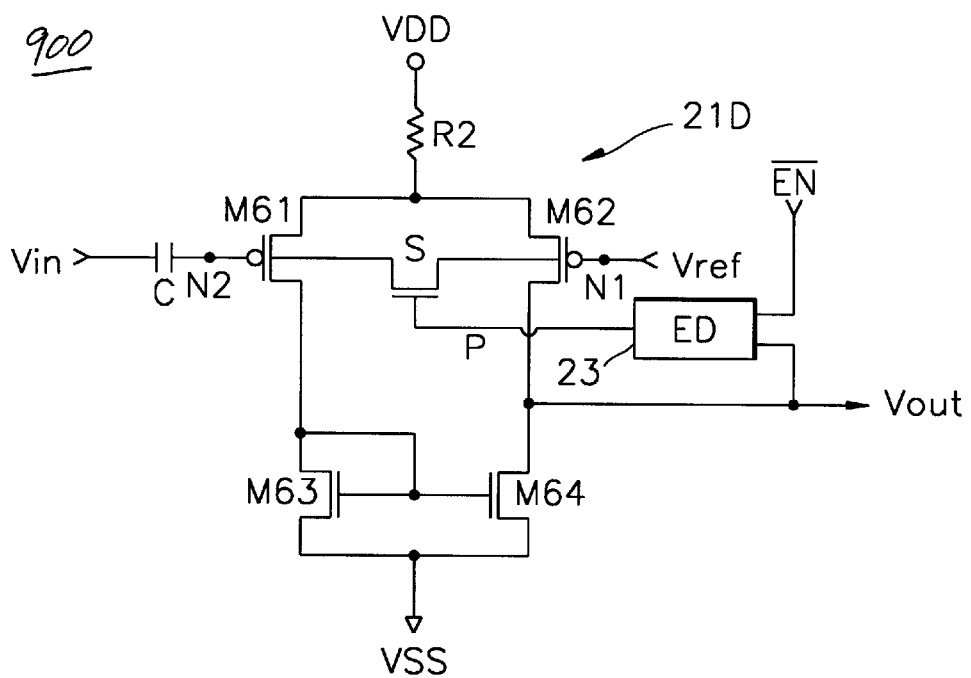

FIG. 9 illustrates an input buffer circuit 900 according to still other embodiments of the invention. A P type differential amplifier 21D coupled between power supply nodes VDD, VSS includes PMOS differential input transistors M61 and M62, NMOS load transistors M63 and M64, and a resistor R2 which acts as a current source. The differential input transistor M62 receives a reference voltage Vref at an input terminal N1. The differential input transistor M61 receives an input signal at an input terminal N2 that is momentarily boosted with respect to an input voltage Vin via operation of an NMOS transistor S connected between the first input terminal N1 and the second input terminal N2. The NMOS transistor S operates responsive to control signal P produced by an edge detector circuit 23 in a manner similar to that described with reference to the switch S of FIG. 3.

Figure 10:
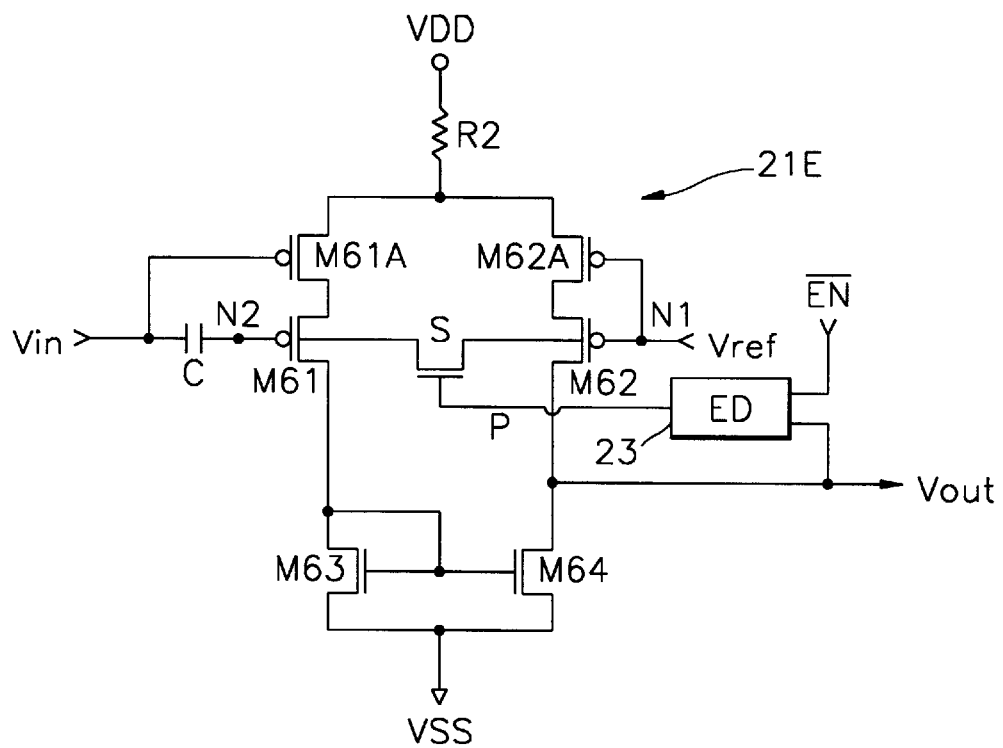

FIG. 10 illustrates an input buffer circuit 1000 according to other embodiments of the present invention. Like reference numerals in FIGS. 9 and 10 refer to like elements, which will not be described in further detail here in light of the foregoing description of FIG. 9. The input buffer circuit 1000 of FIG. 10 represents a modification of the input buffer circuit 900 of FIG. 9, in that a differential amplifier circuit 21E of the input buffer 1000 includes PMOS transistors M61A, M62A added in series with the differential input transistors M61, M62.

Figure 11:
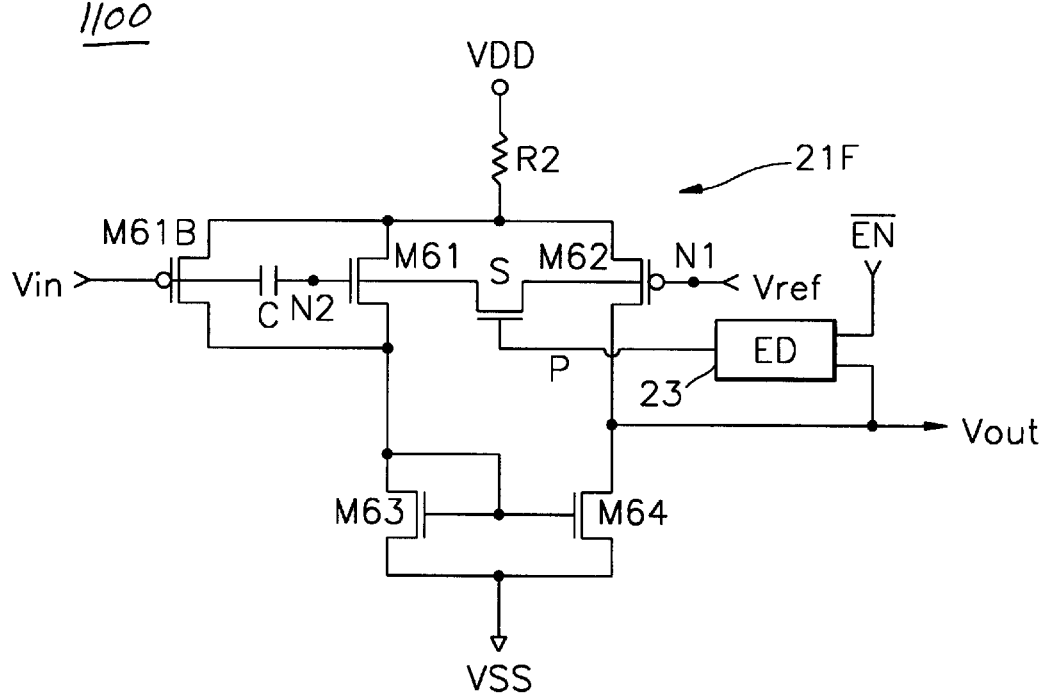

FIG. 11 illustrates an input buffer circuit 1100 according to other embodiments of the present invention. Like reference numerals in FIGS. 9 and 11 refer to like elements, which will not be described in further detail here in light of the foregoing description of FIG. 9. The input buffer circuit 1100 of FIG. 11 represents a modification of the input buffer circuit 900 of FIG. 9, in that a differential amplifier 21F of the input buffer 1100 includes a PMOS transistor M61B connected in parallel with the differential input transistor M61.

Figure 12:
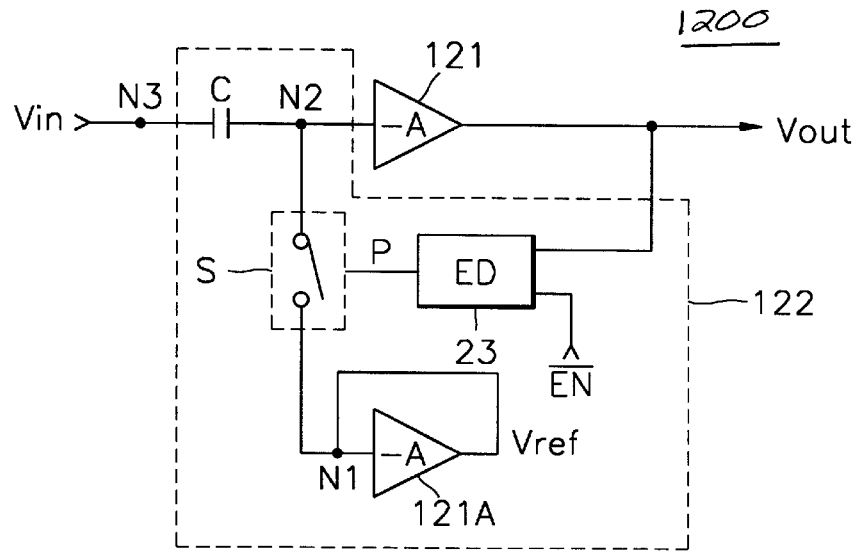
FIGS. 12 and 13 are schematic diagrams of input buffer circuits according to still other embodiments of the present invention.

FIG. 12 illustrates an input buffer circuit 1200 according to still other embodiments of the present invention. The input buffer circuit 1200 includes an inverting amplifier 121, and a momentary boost circuit 122 including a boosting capacitor C, an edge detector circuit 23, a reference voltage generating circuit 121A and a switch S. The inverting amplifier 121 amplifies a signal applied at an input terminal N2, producing an output signal Vout. The boosting capacitor C is connected between an input buffer circuit input terminal N3 and the input terminal N2 of the inverting amplifier 121, and momentarily boosts the voltage at the input terminal N2 with respect to an input signal Vin applied to the input node N3 responsive to operation of the switch S. The edge detector circuit 23 detects transitions of the output signal Vout, and generates pulses in a control signal P responsively thereto. The reference voltage generating circuit 121A generates a reference voltage Vref substantially equal to a logic threshold voltage of the inverting amplifier 121. The switch S is operative to couple the input terminal N2 of the inverting amplifier 121 and an output terminal N1 of the reference voltage generating circuit 121A responsive to the control signal P. The edge detector circuit 23 and the switch circuit S operate in a manner as described above with reference to FIG. 3. The reference voltage generating circuit 121A preferably is substantially identical to the inverting amplifier 121, with the input terminal and the output terminal of the voltage reference circuit 121A connected in common, such that reference voltage Vref produced by the reference voltage generating circuit 121A is substantially identical to the threshold voltage of the inverting amplifier 121. The input buffer circuit 1200 may operate in a manner similar to that described above with reference to FIG. 4.

Figure 13:
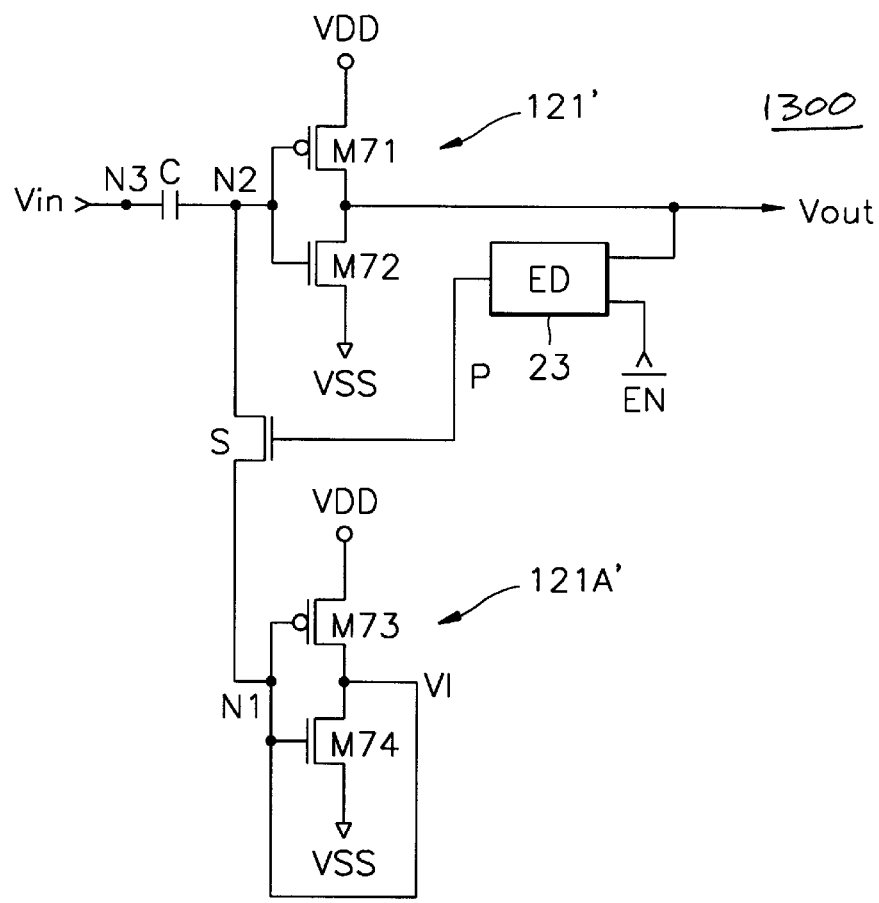

FIG. 13 illustrates an input buffer circuit 1300 according to embodiments of the present invention. The input buffer circuit 1300 includes in inverting amplifier 121' including a PMOS transistor M71 and an NMOS transistor M72. A reference voltage generating circuit 121A' includes a PMOS transistor M73, preferably one which is approximately identical to the PMOS transistor M71, and an NMOS transistor M74, which preferably is approximately identical to the NMOS transistor M72. An NMOS transistor S is connected between the input terminal N2 of the inverting amplifier and the output terminal N1 of the reference voltage generating circuit, and is responsive to a control signal P produced by an edge detector circuit 23.

Figure 14:
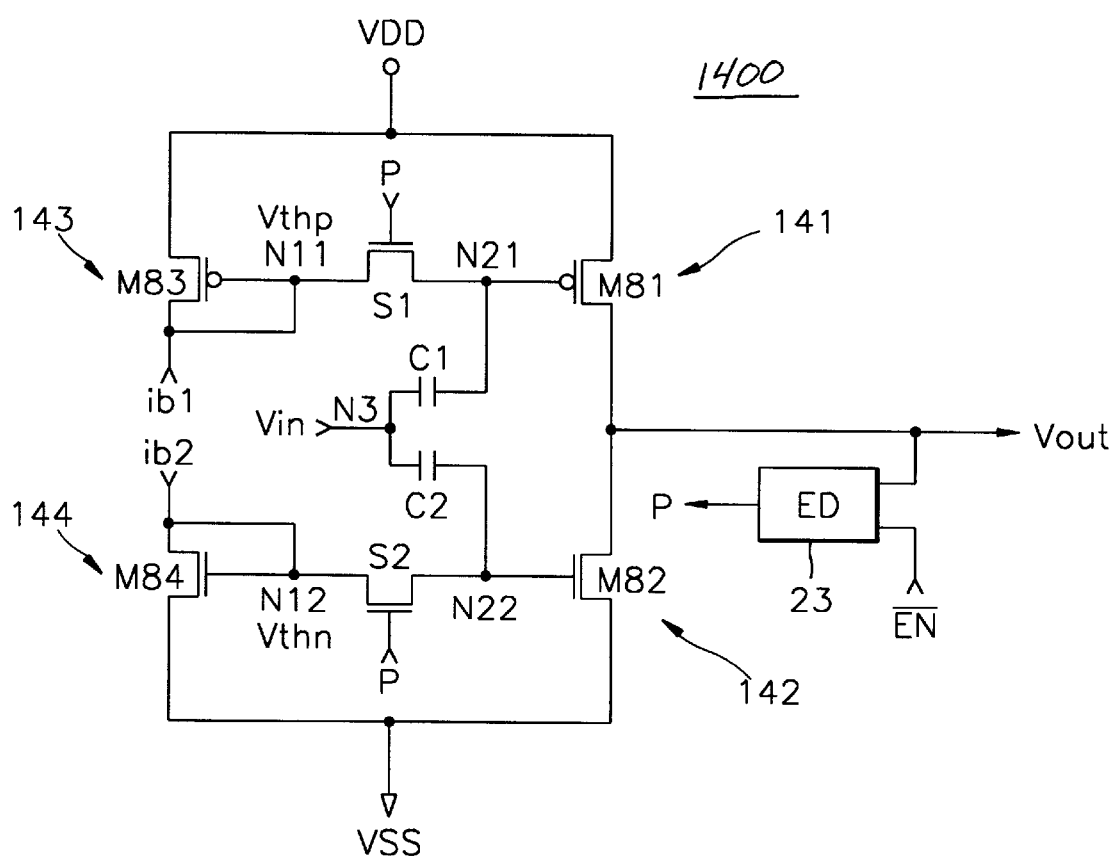
FIG. 14 is a schematic diagram of an input buffer circuit according to yet other embodiments of the present invention.

FIG. 14 illustrates an input buffer circuit 1400 according to other embodiments of the present invention. The input buffer circuit 1400 includes a pull-up circuit 141 including a PMOS transistor M81 and a pull-down circuit 142 including a PMOS transistor M82, coupled to power supply nodes VDD, VSS. In combination, the pull-up and pull-down circuits 141, 142 produce an output signal Vout responsive to signals at respective input terminals N21, N22. The input buffer circuit 1400 further includes first and second boosting capacitors C1, C2, first and second switches S1, S2, and first and second reference voltage generating circuits 143, 144 including respective NMOS transistors M83, M84. The first boosting capacitor C1 is connected between an input buffer input terminal N3 and the input terminal N21 and generates a signal at the input terminal N2 that is boosted with respect to an input signal Vin applied at the input buffer input terminal N3. The second boosting capacitor C2 is connected between the input buffer input terminal N3 and the input terminal N22 and generates a signal at the input terminal N22 that is boosted with respect to the input signal Vin. The edge detector circuit 23 detects transitions of the output signal Vout, and responsively generates a control signal P that controls the switches S1, S2.

The reference voltage generating circuit 143 receives a reference bias current ib1 and responsively generates a first reference voltage Vthp having a value approximately the same as the threshold voltage of the pull-up transistor M81 at an output terminal N11. The reference voltage generating circuit 144 receives a reference bias current ib2 and responsively generates a second reference voltage Vthn having a value approximately the same as the threshold voltage of the pull-down transistor M82 at an output terminal N12. The first switch S1 is connected between the output terminal N11 and the input terminal N21 of the pull-up circuit 141 and applies the first reference voltage Vthp to the input terminal N21 of the pull-up circuit 141 responsive to the control signal P. The second switch S2 is connected between the output terminal N12 and the input terminal N22 of the pull-down circuit 142 and applies the second reference voltage Vthn to the input terminal N22 of the pull-down circuit 142 responsive to the control signal P. The input buffer circuit 1400 may operate in a manner similar to that described above with reference to FIG. 4.

In the drawings and specification, there have been disclosed typical preferred embodiments of the invention and, although specific terms are employed, they are used in a generic and descriptive sense only and not for purposes of limitations, the scope of the invention being set forth in the following claims. While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An input buffer, comprising:
   an input buffer input terminal;
   an amplifier circuit having an input terminal and an output terminal; and
   a momentary boost circuit coupled to the input buffer input terminal, the input terminal of the amplifier circuit, and the output terminal of the amplifier circuit, the momentary boost circuit operative to generate a boosted input signal at the input terminal of the amplifier circuit from an input signal at the input buffer input terminal for an interval that is terminated responsive to an output signal at the output terminal of the amplifier circuit.

2. An input buffer according to claim 1, wherein the momentary boost circuit comprises:
   a detector circuit coupled to the output terminal of the amplifier circuit and operative to generate a control signal responsive to a transition of the output signal; and
   a boost circuit, coupled between the input buffer input terminal and the input terminal of the amplifier circuit and operatively associated with the detector circuit, that receives the input signal at the input buffer input terminal and generates the boosted input signal at the input terminal of the amplifier circuit from the received input signal responsive to the control signal.

3. An input buffer according to claim 2, wherein the boost circuit comprises:
   a capacitor coupled between the input buffer input terminal and the input terminal of the amplifier circuit; and
   a switch that couples and decouples the input terminal of the amplifier circuit to a reference voltage source responsive to the control signal.

4. An input buffer according to claim 3, wherein the detector circuit is operative to generate a pulse responsive to a transition of the output signal, and wherein the switch is operative to couple the input terminal of the amplifier circuit to the reference voltage source responsive to the pulse.

5. An input according to claim 4, wherein the detector circuit comprises:
   a delay circuit that receives the output signal and generates a delayed signal therefrom;
   an inverting delay circuit that receives the delayed signal and generates an inverted delayed signal therefrom; and
   an exclusive NOR gate circuit that exclusive NOR's the delayed signal and the inverted delayed signal to generate a pulse signal.

6. An input buffer according to claim 3, further comprising a reference voltage generating circuit that provides the reference voltage source.

7. An input buffer according to claim 2:
   wherein the amplifier circuit comprises a differential amplifier circuit having a first input terminal, a second input terminal, and an output terminal, the differential amplifier circuit operative to generate an output signal at the output terminal responsive to a voltage between the first and second input terminals;
   wherein the boost circuit is coupled between the input buffer input terminal and the first input terminal of the differential amplifier circuit and receives the input signal at the input buffer input terminal and generates the boosted input signal at the first input terminal of the differential amplifier circuit from the received input signal responsive to the control signal.

8. An input buffer according to claim 7, wherein the boost circuit comprises:
   a capacitor coupled between the input buffer input terminal and the first input terminal of the differential amplifier circuit; and
   a switch that couples and decouples the first and second input terminals of the differential amplifier circuit responsive to the control signal.

9. An input buffer according to claim 8, wherein the detector circuit is operative to generate a pulse responsive to a transition of the output signal, and wherein the switch is operative to couple the first and second input terminals of the differential amplifier circuit responsive to the pulse.

10. An input buffer according to claim 2, wherein the amplifier circuit comprises an inverting amplifier circuit.

11. An input buffer according to claim 10, wherein the boost circuit comprises:
    a capacitor coupled between the input buffer input terminal and an input terminal of the inverting amplifier circuit; and
    a switch that couples and decouples the input terminal of the inverting amplifier circuit to a reference voltage source responsive to the control signal.

12. An input buffer according to claim 11, wherein the detector circuit is operative to generate a pulse responsive to a transition of the output signal, and wherein the switch is operative to couple the input terminal of the inverting amplifier circuit to a reference voltage source responsive to the pulse.

13. An input buffer according to claim 2:
    wherein the amplifier circuit comprises:
      a pull-up circuit that drives the output terminal responsive to a signal at a pull-up circuit input terminal, and
      a pull-down circuit that drives the output terminal responsive to a signal at a pull-down circuit input terminal; and
    wherein the boost circuit is coupled between the input buffer input terminal and the pull-up circuit and pull-down circuit input terminals, receives the input signal at the input buffer input terminal and generates the first and second boosted input signals at respective ones of the pull-up circuit and pull-down circuit input terminals from the received input signal responsive to the control signal.

14. An input buffer according to claim 13, wherein the boost circuit comprises:
   respective first and second capacitors that couple the input buffer input terminal to respective ones of the pull-up circuit input terminal and the pull-down circuit input terminal; and
   respective first and second switches that couple and decouple respective ones of the pull-up circuit input terminal and the pull-down circuit input terminal to a reference voltage source responsive to the control signal.

15. An input buffer according to claim 14, wherein the detector circuit is operative to generate a pulse responsive to a transition of the output signal, and wherein the switch is operative to couple the input terminals of the pull-up circuit and the pull-down circuit to a reference voltage source responsive to the pulse.

16. An input buffer according to claim 1, wherein the momentary boost circuit is operative to generate the boosted input signal at the input terminal of the amplifier circuit from the input signal at the input buffer input terminal for an interval that is terminated responsive to an edge transition of the output signal at the output terminal of the amplifier circuit.

17. A method of buffering an input signal, the method comprising:
   receiving the input signal at an input buffer input terminal; and
   momentarily generating a boosted input signal at an input terminal of an amplifier circuit from the received input signal for an interval that is terminated responsive to an output signal produced at an output terminal of the amplifier circuit from the boosted input signal.

18. A method according to claim 17, wherein the step of momentarily generating comprises:
   generating a control signal responsive to the output signal; and
   generating the boosted input signal responsive to the control signal.

19. A method according to claim 18, wherein the step of generating the boosted input signal comprises:
   coupling a capacitor between the input buffer input terminal and the input terminal of the amplifier while decoupling the input terminal of the amplifier circuit and a reference voltage source responsive to a first state of the control signal; and then
   coupling the input terminal of the amplifier circuit to the reference voltage source responsive to a second state of the control signal.

20. A method according to claim 19, wherein the step of generating a control signal comprises generating the second state of the control signal responsive to a transition of the output signal.

21. An input buffer according to claim 20, wherein the step of generating the second state of the control signal comprises generating a pulse responsive to a transition of the output signal, and wherein the step of coupling the input terminal of the amplifier circuit to the reference voltage source comprises coupling the input terminal of the amplifier circuit to the reference voltage source responsive to the pulse.

22. A method according to claim 17, wherein momentarily generating a boosted input signal at an input terminal of an amplifier circuit from the received input signal for an interval that is terminated responsive to an output signal produced at an output terminal of the amplifier circuit from the boosted input signal comprises terminating boost of the input signal at the input terminal of the amplifier circuit responsive to an edge transition in the output signal produced at the output terminal of the amplifier circuit.

23. An input buffer circuit comprising:
   a differential amplifier circuit that amplifies a signal input via a second input terminal, on the basis of a reference voltage, which is input via a first input terminal, and outputs an amplified signal;
   a boosting capacitor connected between an input node and the second input terminal of the differential amplifier circuit, that boosts an input signal which is input via the input node;
   an edge detector circuit that detects a transition of the output signal of the differential amplifier circuit; and
   a switch connected between the first input terminal and the second input terminal of the differential amplifier circuit, that applies the reference voltage to the second input terminal in response to an output signal of the edge detector circuit.

24. The input buffer circuit of claim 23, wherein the first and second input terminals of the differential amplifier circuit remain at the level of the reference voltage while the input signal is not being subject to the transition.

25. The input buffer circuit of claim 23, wherein the edge detector circuit comprises a pulse generator circuit that detects a rising edge and a falling edge of the output signal of the differential amplifier circuit and generates a pulse signal.

26. The input buffer circuit of claim 25, wherein the edge detector circuit comprises:
   a delay circuit that delays the output signal of the differential amplifier circuit to produce a delayed output signal;
   an inverting delay circuit that inverts an output signal of the delay circuit and and produces a delayed inverted output signal; and
   an exclusive NOR gate circuit that receives the delayed output signal of the delay circuit and the delayed inverted output signal of the inverting delay circuit and generates the pulse signal in response to an enable signal.

27. An input buffer circuit comprising:
   an inverting amplifier circuit that amplifies a signal which is input via an input terminal and outputs an amplified signal;
   a boosting capacitor connected between an input node and the input terminal of the inverting amplifier circuit, that boosts an input signal which is input via the input node;
   an edge detector circuit that detects the transition of the output signal of the inverting amplifier circuit;
   voltage reference means for generating a reference voltage having the same value as that of a logic threshold voltage of the inverting amplifier circuit; and
   a switch connected between the input terminal of the inverting amplifier circuit and an output terminal of the voltage reference means, that applies the reference voltage to the input terminal of the inverting amplifier circuit in response to an output signal of the edge detector circuit.

28. The input buffer circuit of claim 27, wherein the input terminal of the inverting amplifier circuit and the output terminal of the voltage reference means remain at the level of the reference voltage while the input signal is not being subject to the transition.

29. The input buffer circuit of claim 27, wherein the edge detector circuit comprises a pulse generator generator circuit that detects a rising edge and a falling edge of the output signal of the inverting amplifier circuit and generates a pulse signal.

30. The input buffer circuit of claim 27, wherein the edge detector circuit comprises:
   a delay circuit that delays the output signal of the inverting amplifier circuit to produce a delayed output signal;
   an inverting delay circuit that inverts the delayed output signal of the delay circuit and produces a delayed inverted output signal; and
   an exclusive NOR gate circuit that receives the delayed output signal of the delay circuit and the inverted delayed output signal of the inverting delay circuit and generates the pulse signal in response to an enable signal.

31. The input buffer circuit of claim 27, wherein the voltage reference means is composed of the same circuit as the inverting amplifier circuit and the input and output terminals of the voltage reference means are connected in common.

32. An input buffer circuit comprising:
   a pull-up amplifier circuit that amplifies a signal which is input via a first input terminal and outputs an amplified signal as an output signal;
   a pull-down amplifier circuit that amplifies a signal which is input via a second input terminal and outputs an amplified signal as the output signal;
   a first boosting capacitor connected between an input node and the first input terminal, that boosts an input signal which is input via the input node;
   a second boosting capacitor connected between the input node and the second input terminal, that boosts the input signal;
   an edge detector circuit that detects transition of the output signal;
   first voltage reference means for generating a first reference voltage having the same value as that of a threshold voltage of the pull-up amplifier circuit;
   second voltage reference means for generating a second reference voltage having the same value as that of a threshold voltage of the pull-down amplifier circuit;
   a first switch connected between the first input terminal and an output terminal of the first voltage reference means, that applied the first reference voltage to the first input terminal in response to an output signal of the edge detector circuit; and
   a second switch connected between the second input terminal and an output terminal of the second voltage reference means, that applies the second reference voltage to the second input terminal in response to the output signal of the edge detector circuit.

33. The input buffer circuit of claim 32, wherein the pull-up amplifier circuit is a PMOS transistor.

34. The input buffer circuit of claim 32, wherein the pull-down amplifier circuit is an NMOS transistor.

35. The input buffer circuit of claim 32, wherein the edge detector circuit comprises a pulse generator circuit that detects a rising edge and a falling edge of the output signal and generates a pulse signal.

36. The input buffer circuit of claim 35, wherein the edge detector circuit comprises:
   a delay circuit that delays the output signal to produce a delayed output signal;
   an inverting delay circuit that inverts the delayed output signal of the delay circuit and produces an delayed inverted output signal; and
   an exclusive NOR gate circuit that receives the delayed output signal of the delay circuit and the delayed inverted output signal of the inverting delay circuit and generates the pulse signal in response to an enable signal.

37. The input buffer circuit of claim 32, wherein the first voltage reference means is a PMOS transistor, the gate and drain of which are connected in common, a reference bias current is applied to the drain and the first reference voltage is outputted via the gate.

38. The input buffer circuit of claim 32, wherein the second voltage reference means is an NMOS transistor, the gate and drain of which are connected in common, a reference bias current is applied to the drain and the second reference voltage is outputted via the gate.

* * * * *